(12) United States Patent
Shriwas et al.

(10) Patent No.: US 12,443,580 B2
(45) Date of Patent: Oct. 14, 2025

(54) METHOD AND RELATIONSHIP CONSTRAINT MANAGEMENT SERVER FOR MANAGING RELATIONSHIP CONSTRAINTS ASSOCIATED WITH ENTITIES

(71) Applicant: Rakuten Mobile, Inc., Tokyo (JP)

(72) Inventors: Pawan Shriwas, Indore (IN); Apurva Tripathi, Indore (IN); Ayush Kumar Singh, Indore (IN); Pankaj Pachori, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/923,599

(22) PCT Filed: Aug. 29, 2022

(86) PCT No.: PCT/US2022/041800
§ 371 (c)(1),
(2) Date: Nov. 7, 2022

(87) PCT Pub. No.: WO2024/010594
PCT Pub. Date: Jan. 11, 2024

(65) Prior Publication Data
US 2024/0330262 A1 Oct. 3, 2024

(30) Foreign Application Priority Data
Jul. 6, 2022 (IN) .............................. 202241038761

(51) Int. Cl.
*G06F 16/22* (2019.01)

(52) U.S. Cl.
CPC ................................ *G06F 16/2272* (2019.01)

(58) Field of Classification Search
CPC .................................................... G06F 16/2272
See application file for complete search history.

(56) References Cited

U.S. PATENT DOCUMENTS

| 8,005,834 B2 * | 8/2011 | Karve | G06F 16/24561 |
| | | | 707/769 |
| 10,089,676 B1 * | 10/2018 | Gupta | G06Q 30/0633 |

(Continued)

*Primary Examiner* — Merilyn P Nguyen
(74) *Attorney, Agent, or Firm* — HAUPTMAN HAM, LLP

(57) ABSTRACT

Embodiment herein provides a method for managing relationship constraints associated with entities in a graph database. The method includes receiving, by a relationship constraint management server, a request to perform operation associated with entity and generating, by the relationship constraint management server, an entity configuration file based on the received information of the entity. The request comprises information of entity and, the entity configuration file includes a relationship constraint from a plurality of relationship constraints to be applied while performing the operation. The method includes retrieving, by the relationship constraint management server, metadata corresponding to relationship constraints from a constraint database based on the entity configuration file, and performing, by the relationship constraint management server, the operation associated with the entity based on the metadata corresponding to the relationship constraints and the information of the entity.

23 Claims, 13 Drawing Sheets

(56) References Cited

U.S. PATENT DOCUMENTS

| | | | | |
|---|---|---|---|---|
| 11,010,284 | B1* | 5/2021 | Santiago | G06N 20/00 |
| 2005/0050068 | A1* | 3/2005 | Vaschillo | G06F 16/25 |
| 2005/0165866 | A1* | 7/2005 | Bohannon | G06F 16/8373 |
| | | | | 707/999.203 |
| 2007/0162902 | A1* | 7/2007 | Pozzi | G06F 8/433 |
| | | | | 717/154 |
| 2008/0046440 | A1* | 2/2008 | Estes | G06F 16/284 |
| 2009/0063555 | A1* | 3/2009 | Fisher | G06F 16/284 |
| 2009/0125872 | A1* | 5/2009 | Kannan | G06F 8/10 |
| | | | | 717/101 |
| 2010/0198844 | A1* | 8/2010 | Ribbe | G06F 8/35 |
| | | | | 707/755 |
| 2010/0241637 | A1* | 9/2010 | Kissner | G06F 16/24565 |
| | | | | 707/752 |
| 2012/0011157 | A1* | 1/2012 | Mauclaire | G06F 8/35 |
| | | | | 707/777 |
| 2013/0346943 | A1* | 12/2013 | Bharatia | G06F 9/4496 |
| | | | | 717/117 |
| 2016/0246838 | A1* | 8/2016 | Li | G06F 16/254 |
| 2017/0093700 | A1* | 3/2017 | Gilley | H04L 69/08 |

* cited by examiner

METHOD AND RELATIONSHIP CONSTRAINT MANAGEMENT SERVER FOR MANAGING RELATIONSHIP CONSTRAINTS ASSOCIATED WITH ENTITIES

PRIORITY CLAIM AND CROSS-REFERENCE

The present application is a National Phase of International Application No. PCT/US2022/041800, filed Aug. 29, 2022, which claims priority to Indian Application No. 202241038761, filed Jul. 6, 2022. The contents of the Indian Patent Application is hereby incorporated by reference in its entirety.

FIELD OF INVENTION

The present invention relates to inventory management and entity management within a graph database and more specifically related to a method and a relationship constraint management server for managing relationship constraints associated with multiple entities.

BACKGROUND

Generally, in a graph database such as for example, janusgraph database relationship constraints and type of a label defined between two edges or two entities are provided on a global graph level. However, the relationship constraints provided at the global graph level does allow a user to define different types of the same label with smaller scope. As a result, the different types of the same label will not have different multiplicity when defined between different entities or edges.

For example, consider a graph associated with networking, stored in the graph database. An edge label used here is "contains" which is defined between multiple entities such as CNFC "contains" CNF (step 102), CNF "contains" clusters (step 104) and CNF "contains" NS (step 106), as shown in FIG. 1. At step 102, the edge label "contains" defines a one-to-one relationship between the CNFC and the CNF, whereas the same edge label "contains" defines a many-to-one relationship between the CNF and the clusters and again the same edge label "contains" defines a many-to-one relationship between the CNF and NS. Since the relationship constraints which is indicated by the edge label is considered at the global graph level in the conventional graph database, the edge label "contains" defined at step 104 and step 106 are not allowed as edge label "contains" is defined at the global graph level as only one-to-one relationship, as defined at step 102. Therefore, the conventional graph database restricts the use of the same edge label to define different multiplicity of the same label in a scenario as indicated in the FIG. 1, where the user is required to same label. Thus, it is desired to address the aforementioned disadvantages or other shortcomings or at least provide a useful alternative.

OBJECT OF INVENTION

The principal object of the embodiments herein is to provide a method and relationship constraint management server for managing relationship constraints associated with entities by generating an entity configuration file for handling controls over relationships between the entities. The proposed relationship constraint management server allows a user to create edge labels with different multiplicity within a graph database which overcomes drawback of existing method of defining the edge labels at a global graph level.

SUMMARY

Accordingly, the embodiment herein is to provide a method for managing relationship constraints associated with entities in a graph database. The method includes receiving, by a relationship constraint management server, a request to perform an operation associated with an entity and generating, by the relationship constraint management server, an entity configuration file based on the received information of the entity. The request includes information of entity and the entity configuration file includes relationship constraint from a plurality of relationship constraints to be applied while performing the operation. Further, the method includes retrieving, by the relationship constraint management server, metadata corresponding to relationship constraints from a constraint database based on the entity configuration file and performing, by the relationship constraint management server, the operation associated with the entity based on the metadata corresponding to the relationship constraints and the information of the entity.

In an embodiment, the operation associated with the entity is a create operation, an update operation, and a delete operation.

In an embodiment, the method further includes determining, by the relationship constraint management server, the determined operation is the create operation and the update operation; and storing, by the relationship constraint management server, the created entity and the updated entity in the graph database.

In an embodiment, performing, by the relationship constraint management server, the operation associated with the entity based on the metadata corresponding to the relationship constraints and the information of the entity includes determining, by the relationship constraint management server, the operation associated with the entity is one of the create operation, the update operation and the delete operation and validating, by the relationship constraint management server, the information received for performing the determined operation associated with the entity by using a relationship constraint key for each of the relationship constraints on the information received for the entity. The method also includes performing, by the relationship constraint management server, the determined operation associated with the entity based on the metadata corresponding to the relationship constraints and the information of the entity.

In an embodiment, performing, by the relationship constraint management server, the create operation associated with the entity based on the metadata corresponding to the relationship constraints and the information of the entity includes generating, by the relationship constraint management server, the relationship constraint key for each of the relationship constraints based on the information of the entity. The determined operation is the creation operation. The method also includes adding, by the relationship constraint management server, the relationship constraint key for each of the relationship constraints in a constraint data field of the entity configuration file and validating, by the relationship constraint management server, the information received for creating the entity by using the relationship constraint key for each of the relationship constraints on the information received for creating the entity. The method also includes creating, by the relationship constraint management server, the entity based on the metadata corresponding to the relationship constraints and the information of the entity in response to successful validation of the information received for creating the entity.

In an embodiment, performing, by the relationship constraint management server, the update operation associated with the entity based on the metadata corresponding to the relationship constraints and the information of the entity includes retrieving, by the relationship constraint management server, the relationship constraint key for each of the relationship constraints in the constraint data field of the entity configuration file of the entity to be updated. The determined operation is the creation operation. The method also includes validating, by the relationship constraint management server, the information received for updating the entity by using the relationship constraint key for each of the relationship constraints on the information received for updating the entity and updating, by the relationship constraint management server, the entity based on the metadata corresponding to the relationship constraints and the information of the entity in response to successful validation of the information received for updating the entity.

In an embodiment, each relationship constraint of the plurality of constrain includes a relationship constraint type, a relationship constraint scope, a relationship constraint scope field, and a relationship constraint field.

In an embodiment, performing, by the relationship constraint management server, the delete operation associated with the entity based on the metadata corresponding to the relationship constraints and the information of the entity includes retrieving, by the relationship constraint management server, the relationship constraint key for each of the relationship constraints in the constraint data field of the entity configuration file of the entity to be deleted. The determined operation is the creation operation. The method also includes validating, by the relationship constraint management server, the information received for deleting the entity by using the relationship constraint key for each of the relationship constraints on the information received for deleting the entity and deleting, by the relationship constraint management server, the relationship constraint key for each of the relationship constraints in the constraint data field of the entity configuration file of the entity to be deleted; and deleting, by the relationship constraint management server, the relationship associated with the entity to be deleted.

Accordingly, the embodiments herein provide a relationship constraint management server for managing the relationship constraints associated with the entities in the graph database. The relationship constraint management server includes a memory, a processor, a communicator and a relationship management controller. The relationship constraint management server is configured to receive the request to perform the operation associated with the entity and generate the entity configuration file based on the received information of the entity. The request comprises the information of the entity and the entity configuration file includes the relationship constraint from the plurality of relationship constraints to be applied while performing the operation. The relationship constraint management server is also configured to retrieve the metadata corresponding to the relationship constraints from the constraint database based on the entity configuration file and perform the operation associated with the entity based on the metadata corresponding to the relationship constraints and the information of the entity.

Accordingly, the embodiments herein provide a computer program product (CPP) for managing relationship constraints associated with entities in a graph database. The CPP includes a computer executable program code recorded on a computer readable non-transitory storage medium. The said computer executable program code when executed causing the actions including receiving a request to perform an operation associated with an entity and generating an entity configuration file based on the received information of the entity. The request includes information of the entity and the entity configuration file includes relationship constraint from a plurality of relationship constraints to be applied while performing the operation. The said computer executable program code when executed causing the actions also including retrieving metadata corresponding to relationship constraints from a constraint database based on the entity configuration file; and performing the operation associated with the entity based on the metadata corresponding to the relationship constraints and the information of the entity.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
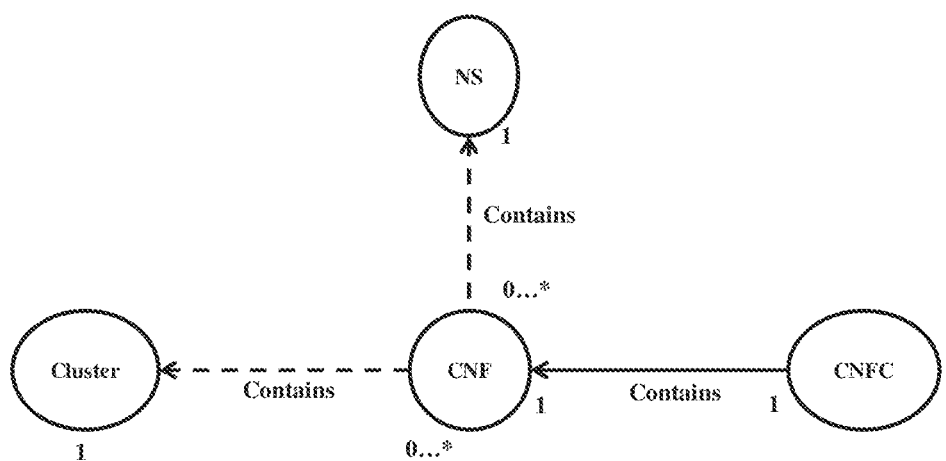
FIG. 1 is a scenario of a label defined at a global graph level in a graph database, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiment herein is to provide a method for managing relationship constraints associated with entities in a graph database. The method includes receiving, by a relationship constraint management server, a request to perform operation associated with an entity and generating, by the relationship constraint management server, an entity configuration file based on the received information of the entity. The request includes information of entity and the entity configuration file includes relationship constraint from a plurality of relationship constraints to be applied while performing the operation. Further, the method includes retrieving, by the relationship constraint management server, metadata corresponding to relationship constraints from a constraint database based on the entity configuration file; and performing, by the relationship constraint management server, the operation associated with the entity based on the metadata corresponding to the relationship constraints and the information of the entity.

Accordingly, the embodiments herein provide a relationship constraint management server for managing relationship constraints associated with entities in a graph database. The relationship constraint management server includes a memory, a processor, a communicator and a relationship management controller. The relationship constraint management server is configured to receive a request to perform operation associated with entity and generate an entity configuration file based on the received information of the entity. The request comprises information of entity and the entity configuration file includes relationship constraint from a plurality of relationship constraints to be applied while performing the operation. The relationship constraint management server is also configured to retrieve metadata corresponding to relationship constraints from a constraint database based on the entity configuration file and perform the operation associated with the entity based on the metadata corresponding to the relationship constraints and the information of the entity.

Accordingly, the embodiments herein provide a computer program product (CPP) for managing relationship constraints associated with entities in a graph database. The CPP includes a computer executable program code recorded on a computer readable non-transitory storage medium. The said computer executable program code when executed causing the actions including receiving a request to perform an operation associated with an entity and generating an entity configuration file based on the received information of the entity. The request includes information of the entity and the entity configuration file includes relationship constraint from a plurality of relationship constraints to be applied while performing the operation. The said computer executable program code when executed causing the actions also including retrieving metadata corresponding to relationship constraints from a constraint database based on the entity configuration file; and performing the operation associated with the entity based on the metadata corresponding to the relationship constraints and the information of the entity.

In the conventional graph database such as for example, janusgraph database relationship constraints are provided on a global graph level for a particular edge label or type. However, the relationship constraints provided at the global graph level restricts defining same edge label or type on a smaller scope based on user requirement. Unlike the conventional graph database, the proposed method provides more flexibility in the graph database by building a custom layer on the top of the janusgrpah to allow the same edge label or type based on user requirement by defining the relationship constraint not at the global graph level.

Referring now to the drawings and more particularly to FIGS. 2 through 10, where similar reference characters denote corresponding features consistently throughout the figures, there are shown preferred embodiments.

Figure 2:
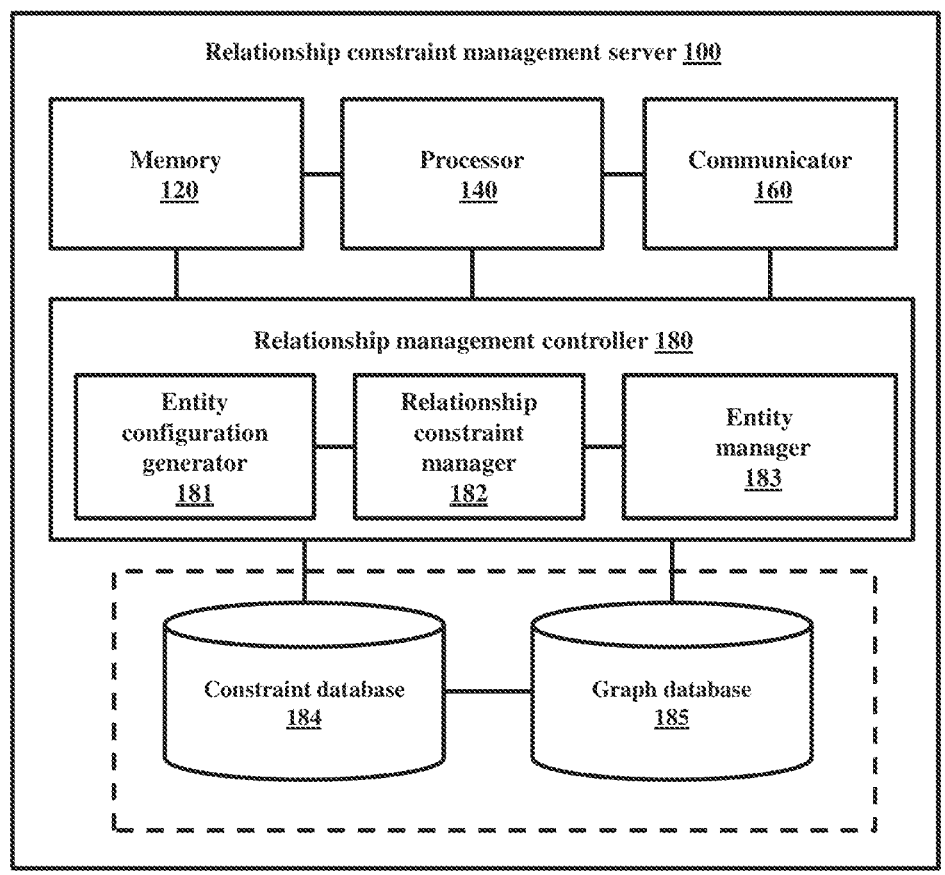
FIG. 2 is a block diagram of a relationship constraint management server for managing relationship constraints associated with entities in the graph database, according to an embodiment as disclosed herein.

FIG. 2 is a block diagram of a relationship constraint management server (100) for managing relationship constraints associated with entities in a graph database (185), according to an embodiment as disclosed herein.

In an embodiment, the relationship constraint management server (100) includes a memory (120), a processor (140), a communicator (160) and a relationship management controller (180).

The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160), and the relationship management controller (180). The processor (140) is configured to execute instructions stored in the memory (120) and to perform various processes. The processor may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the relationship constraint management server (100) and with external devices via one or more networks.

In an embodiment, the relationship management controller (180) is implemented by processing circuitry such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductors. The relationship management controller (180) includes an entity configuration generator (181), a relationship constraint manager (182), an entity manager (183), a constraint database (184) and a graph database (185).

In an embodiment, the entity configuration generator (181) is configured to receive a request to perform an operation associated with an entity and generate an entity configuration file based on the received information of the entity. The entity can be for example, students and colleges in a graph associated with academic; various departments of government in a graph associated with government organization, etc. The request includes information of the entity such as for example but not limited to type of entity, relationship of the entity with other entities, properties of the entity, etc. The entity configuration file includes the relationship constraints relevant for the entity out of multiple relationship constraints, to be applied while performing the operation. Each relationship constraint of the multiple constrains includes a relationship constraint type, a relationship constraint scope, a relationship constraint scope field, and a relationship constraint field.

In an embodiment, the relationship constraint manager (182) is configured to retrieve metadata corresponding to the relationship constraints from the constraint database (184) based on the entity configuration file. The metadata corresponding to the relationship constraints can be for example but not limited to a user details associated with creation of the relationship constraint, date of creation of the relationship constraint, etc.

In an embodiment, the entity manager (183) is configured to determine the operation associated with the entity is one of a create operation, an update operation and a delete operation and validate the information received for performing the determined operation associated with the entity by using a relationship constraint key for each of the relationship constraints on the information received for the entity. Further, the entity manager (183) is configured to perform the determined operation associated with the entity based on the metadata corresponding to the relationship constraints and the information of the entity. The operation associated with the entity can include but is not limited to the create operation for creation of the entity, the update operation for updating a feature of the already existing entity and the delete operation for deleting the existing entity from the graph database (185). When the operation is either the create operation or the update operation, then the entity manager (183) is configured to store the created entity and the updated entity in the graph database (185) automatically.

The entity manager (183) performs the create operation as the entity manager (183) is configured to generate the relationship constraint key for each of the relationship constraints based on the information of the entity and add the relationship constraint key for each of the relationship constraints in a constraint data field of the entity configuration file. Further, the entity manager (183) is configured to validate the information received for creating the entity by using the relationship constraint key for each of the relationship constraints on the information received for creating the entity and create the entity based on the metadata corresponding to the relationship constraints and the information of the entity in response to successful validation of the information received for creating the entity.

The entity manager (183) performs the update operation as the entity manager (183) is configured to retrieve the relationship constraint key for each of the relationship constraints in the constraint data field of the entity configuration file of the entity to be updated and validate the information received for updating the entity by using the relationship constraint key for each of the relationship constraints on the information received for updating the entity. Further, the entity manager (183) is configured to update the entity based on the metadata corresponding to the relationship constraints and the information of the entity in response to successful validation of the information received for updating the entity.

The entity manager (183) performs the delete operation as the entity manager (183) is configured to retrieve the relationship constraint key for each of the relationship constraints in the constraint data field of the entity configuration file of the entity to be deleted and validate the information received for deleting the entity by using the relationship constraint key for each of the relationship constraints on the information received for deleting the entity. Further, the entity manager (183) is configured to delete the relationship constraint key for each of the relationship constraints in the constraint data field of the entity configuration file of the entity to be deleted and delete the relationship associated with the entity to be deleted.

In an embodiment, the constraint database (184) is configured to store actual configuration of each of the multiple relationship constraints. The actual configuration of the relationship constraints is not provided to the relationship constraint manager (182), whereas only the metadata corresponding to the relationship constraints are shared with the relationship constraint manager (182) from the constraint database (184) based on the entity configuration file.

In an embodiment, the graph database (185) includes the entities created by the user. In an embodiment, the constraint database (184) and the graph database (185) may be separate elements located within the relationship constraint management server (100). In another embodiment, the constraint database (184) and the graph database (185) may be a single element located within the relationship constraint management server (100) (indicated by dotted lines in the FIG. 1). The constraint database (184) and the graph database (185) may be located within the memory (120) or out of the memory (120) of the relationship constraint management server (100). For example but not limited to, the graph database (185) is a JanusGraph. The JanusGraph is a scalable graph database optimized for storing and querying graphs containing hundreds of billions of vertices and edges distributed across a multi-machine cluster.

Although the FIG. 2 shows various hardware components of the relationship constraint management server (100), but it is to be understood that other embodiments are not limited thereon. In other embodiments, the relationship constraint management server (100) may include less or a greater number of components. Further, the labels or names of the components are used only for illustrative purpose and does not limit the scope of the invention. One or more components can be combined to perform same or substantially similar function to manage the relationship constraints associated with the entities in the graph database (185).

Figure 3:
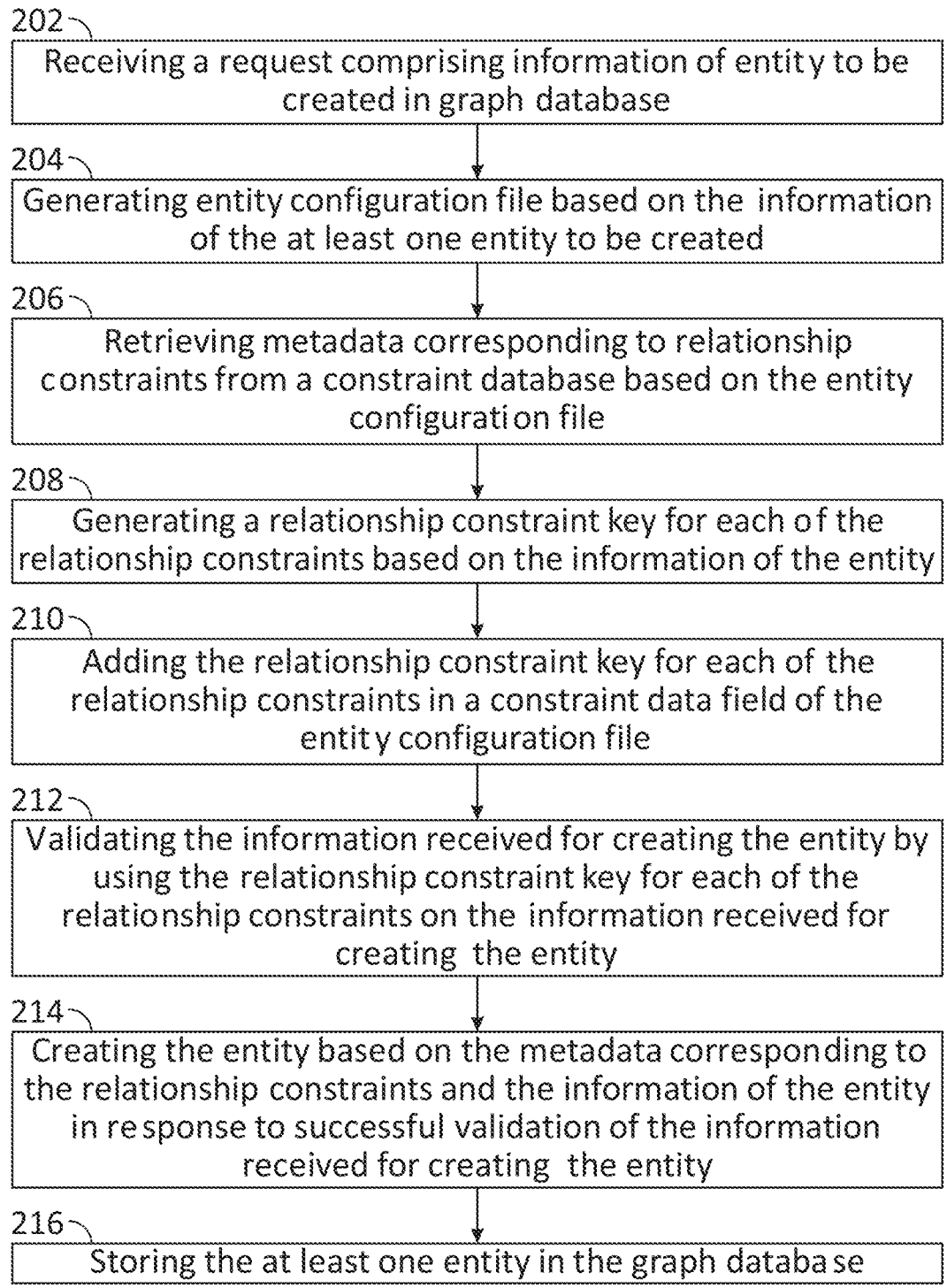
FIG. 3 is a flow chart illustrating a method for managing the relationship constraints associated with the entities in the graph database, according to an embodiment as disclosed herein.

FIG. 3 is a flow chart illustrating a method for managing the relationship constraints associated with the entities in the graph database (185), according to an embodiment as disclosed herein.

Referring to the FIG. 3, at step 202, the method includes the relationship constraint management server (100) receiving the request including the information of entity to be created in the graph database (185). For example, in the relationship constraint management server (100) as illustrated in the FIG. 2, the relationship management controller (180) is configured to receive the request including the information of entity to be created in the graph database (185).

At step 204, the method includes the relationship constraint management server (100) generating the entity configuration file based on the information of the entity to be created. For example, in the relationship constraint management server (100) as illustrated in the FIG. 2, the relationship management controller (180) is configured to generate the entity configuration file based on the information of the entity to be created.

At step 206, the method includes the relationship constraint management server (100) retrieving the metadata corresponding to the relationship constraints from the constraint database based on the entity configuration file. For example, in the relationship constraint management server (100) as illustrated in the FIG. 2, the relationship management controller (180) is configured to retrieve the metadata corresponding to the relationship constraints from the constraint database based on the entity configuration file.

At step 208, the method includes the relationship constraint management server (100) generating the relationship constraint key for each of the relationship constraints based on the information of the entity. For example, in the relationship constraint management server (100) as illustrated in the FIG. 2, the relationship management controller (180) is configured to generate the relationship constraint key for each of the relationship constraints based on the information of the entity.

At step 210, the method includes the relationship constraint management server (100) adding the relationship constraint key for each of the relationship constraints in the constraint data field of the entity configuration file. For example, in the relationship constraint management server (100) as illustrated in the FIG. 2, the relationship management controller (180) is configured to add the relationship constraint key for each of the relationship constraints in the constraint data field of the entity configuration file.

At step 212, the method includes the relationship constraint management server (100) validating the information received for creating the entity by using the relationship constraint key for each of the relationship constraints on the information received for creating the entity. For example, in the relationship constraint management server (100) as illustrated in the FIG. 2, the relationship management controller (180) is configured to validate the information received for creating the entity by using the relationship constraint key for each of the relationship constraints on the information received for creating the entity.

At step 214, the method includes the relationship constraint management server (100) creating the entity based on the metadata corresponding to the relationship constraints and the information of the entity in response to successful validation of the information received for creating the entity. For example, in the relationship constraint management server (100) as illustrated in the FIG. 2, the relationship management controller (180) is configured to create the entity based on the metadata corresponding to the relationship constraints and the information of the entity in response to successful validation of the information received for creating the entity.

At step 216, the method includes the relationship constraint management server (100) storing the entity in the graph database (185). For example, in the relationship constraint management server (100) as illustrated in the FIG. 2, the relationship management controller (180) is configured to store the entity in the graph database (185).

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the invention.

Figure 4:
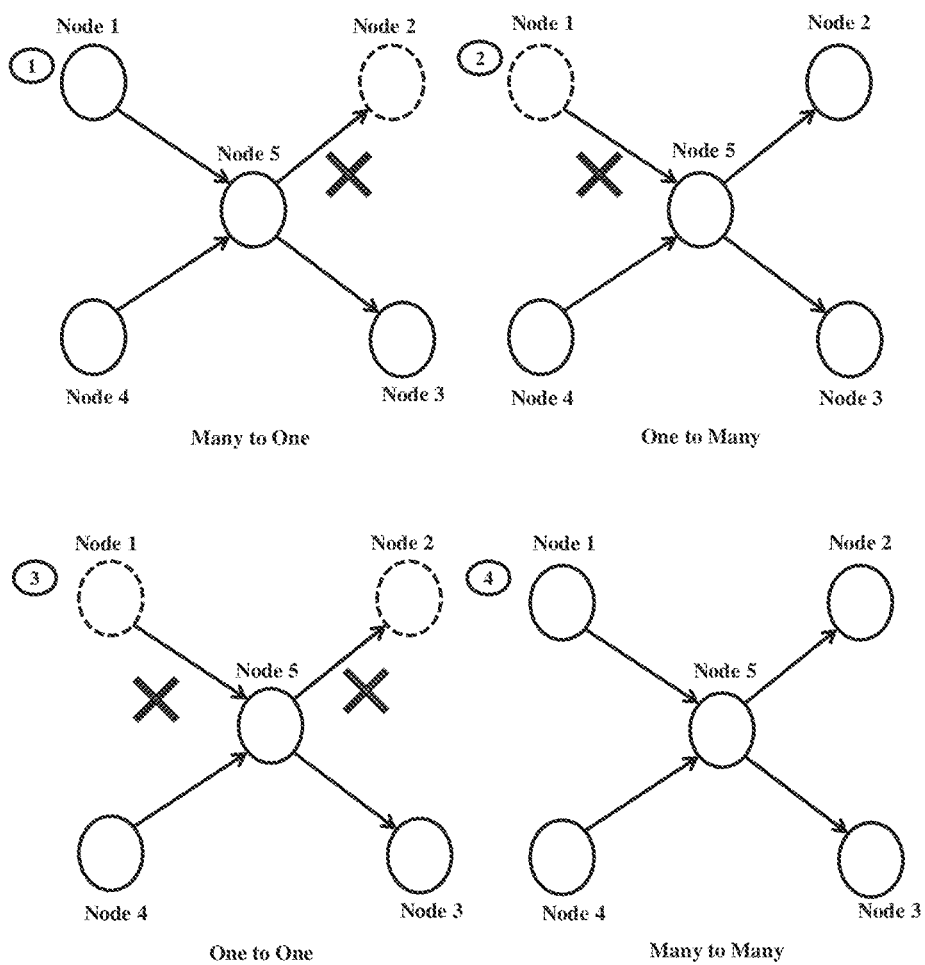
FIG. 4 illustrates various examples of restricted and un-restricted relationships between various entities, according to an embodiment as disclosed herein.

FIG. 4 illustrates various examples of restricted and un-restricted relationships between various entities in the graph database (185), according to an embodiment as disclosed herein.

In general, the graph database (185) does not store the information in the form of rows and columns, rather the graph database (185) stores the information in the form of nodes and vertices, where the nodes and the vertices indicate the entities. In the FIG. 4, circles indicate nodes/vertices and arrows indicate the relationship between any two nodes/vertices.

The multiplicity of the edge label defines a multiplicity constraint on all edges of the edge label, that is, a maximum number of edges between pairs of vertices. The general edge label multiplicity is provided below:

1. MULTI: Allows multiple edges of the same edge label between any pair of vertices i.e., the graph is a multi-graph with respect to the edge label. There is no constraint on the edge multiplicity.
2. SIMPLE: Allows at most one edge of the edge label between any pair of vertices i.e., the graph is a simple graph with respect to the edge label. Ensures that the edges are unique for a given edge label and pairs of vertices.
3. MANY2ONE: Allows at most one outgoing edge of the edge label on any vertex in the graph but places no constraint on incoming edges. For example, an edge label "mother" with MANY2ONE multiplicity since each person has at most one mother but mothers can have multiple children.
4. ONE2MANY: Allows at most one incoming edge of the edge label on any vertex in the graph but places no constraint on the outgoing edges. For example, an edge label winnerOf with ONE2MANY multiplicity since each contest is won by at most one person but a person can win multiple contests.
5. ONE2ONE: Allows at most one incoming and one outgoing edge of the edge label on any vertex in the graph. The edge label marriedTo is an example with ONE2ONE multiplicity since a person is married to exactly one other person.

In the proposed method the relationship constraints are defined in terms of the type of the entities being connected and the type of relationship between the entities. The relationship constraint represents the restriction on the multiplicity of the relationships on each end-point. The types of relationships which are possible to be defined for the same edge label in the proposed method are provided in table. 1 and indicated in the FIG. 4.

TABLE 1

| Relationship | Example | Left | Right |
| --- | --- | --- | --- |
| One-to-one (step 3 in FIG. 4) | person ←—→ birth certificate | 1 | 1 |
| One-to-one (optional on one side) | person ←—→ driving license | 1 | 0 . . . 1 or ? |
| Many-to-one (step 1 in FIG. 4) | person ←—→ birthplace | 1 . . . * or + | 1 |
| Many-to-many (optional on both sides) | person ←—→ book | 0 . . . * or * | 0 . . . * or * |
| One-to-many (step 2 in FIG. 4) | order ←—→ line item | 1 | 1 . . . * or + |
| Many-to-many (step 4 in FIG. 4) | course ←—→ student | 1 . . . * or + | 1 . . . * or + |

Further, the proposed method allows the use of the same edge label with different multiplicity in the graph by defining the source multiplicity and the destination multiplicity in the entity configuration file itself. For example, a YANG syntax of a YANG configuration is extended to include specification of multiplicity/relationship constraints for the entities as indicated in the highlighted portion below:

```
container relationships {
    description "Relationship definitions";
    leaf has_0 {
        type Base:relatedType {
```

-continued

```
            Base:relationship "";
            Base:relType "";
            Base:source "";
            Base:version "";
            Base:sourceMultiplicity "";
            Base:destMultiplicity "";
        }
    }
}
```

For example, consider a scenario where the entities include a college and multiple students will have to be connected to the college. Then, the specification is as provided below:

```
container relationships {
    description "Relationship definitions";
    leaf has_0 {
        type Base:relatedType {
            Base:relationship "enrolledIn";
            Base:relType "College";
            Base:source "Clg-source";
            Base:version "1.0";
            Base:sourceMultiplicity "*";
            Base:destMultiplicity "1";
        }
    }
}
```

In case of the relationship constraints, the relationship constraints are included in the relationship definition, since the relationship constraints are self-contained and are easier to manage.

Valid values for the properties of entities are provided in table. 2:

TABLE 2

| Value | Alternate | Meaning |
| --- | --- | --- |
| 1 | | Exactly one, mandatory |
| 0 . . . 1 | ? | Zero or one, optional |
| 0 . . . * | * | Zero or more, optional |
| 1 . . . * | + | One or more, mandatory |

If the value is not specified then the value of 0 . . . * is assumed, indicating an optional, unrestricted relationship between the entities.

The specification of the relationship constraint is provided in the entity configuration file and stored in the constraint database (184). The properties used for defining the specification of the relationship constraint are provided in table. 3:

TABLE 3

| Attribute | Meaning | Values | From YANG |
| --- | --- | --- | --- |
| mandatory | All fields and scoped data must exist | set to true if either side of the relationship is at least one. | N |
| constraintName | unique name of constraint, constructed | build from the class names, relationship, e.g: "CNF_CNFC_contains". The order of class names indicates the direction of the relationship. | N |

TABLE 3-continued

| Attribute | Meaning | Values | From YANG |
|---|---|---|---|
| con-straintType | Defines what behaviour is being controlled. This may be uniqueness, referential checks, etc. | "relationship" | Y |
| con-straintFields | The list of fields to participate in the constraint | The qualified relationship, including name and RHS class of the relationship, e.g. "contains:CNFC:RCP_Base". | Y |
| con-straintExpr | Additional expression in support of constraint | values of Base:sourceMultiplicity and Base:destMultiplicity, as per constraint value table, such as "0 . . . 1, 1" | Y |

Once the specification is defined in the entity configuration file (i.e., the YANG configuration) then the entity configuration file is uploaded by the relationship constraint management server (100) and create an application program interface (API) is called for creating constraint vertex as the metadata in the schema. Further, the configure API is called for configuring the properties in the schema using the configure API. Furthermore, an apply API is called by the relationship constraint management server (100) to apply the defined relationship constraint.

Figure 5A:
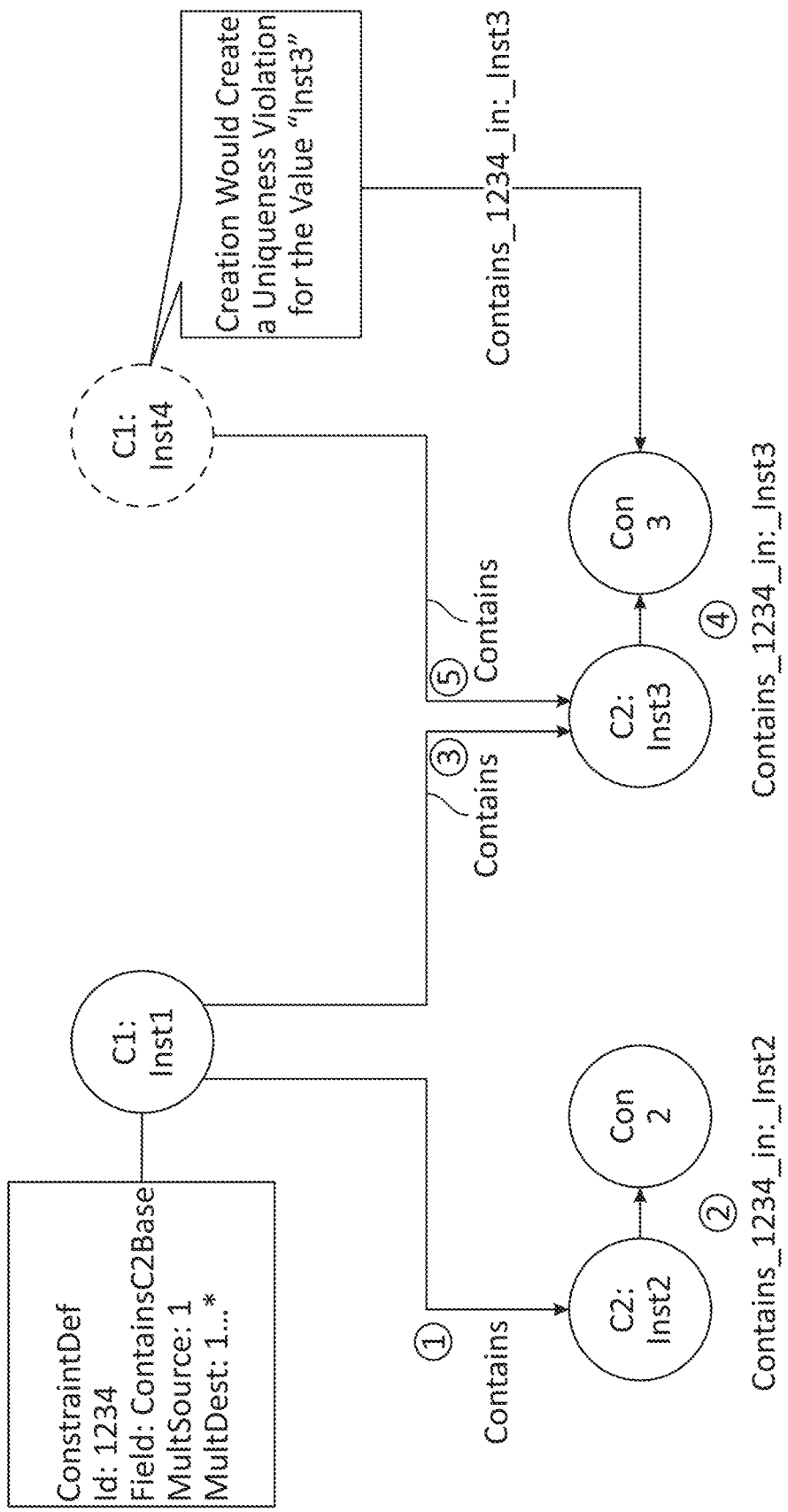
FIG. 5A illustrates a one-to-many relationship scenario between multiple entities where a uniqueness violation is observed, according to an embodiment as disclosed herein.

FIG. 5A illustrates a one-to-many relationship scenario between multiple entities where a uniqueness violation is observed, according to an embodiment as disclosed herein.

Figure 5B:
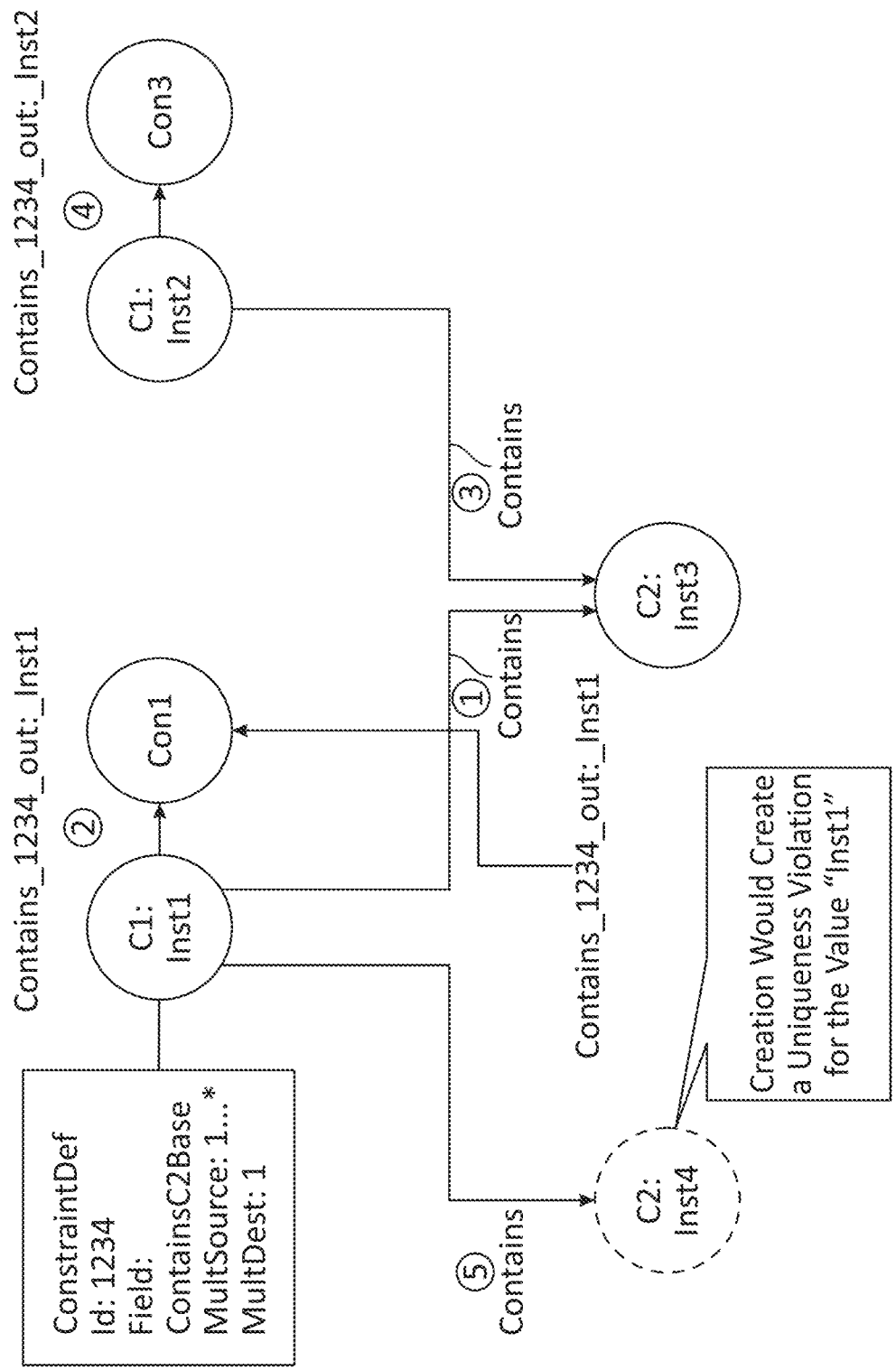
FIG. 5B illustrates a many-to-one relationship scenario between multiple entities where the uniqueness violation is observed, according to an embodiment as disclosed herein.

FIG. 5B illustrates a many-to-one relationship scenario between multiple entities where the uniqueness violation is observed, according to an embodiment as disclosed herein.

The relationship constraint key is mapped to uniqueness conditions. Therefore, in conjunction with the FIG. 4, the one-to-many relationship means that one instance of an object class can relate to any number of "other" instances outgoing (hence no restriction), but from the perspective of the other instance only one instance of a class can have an incoming relationship to the other instance. That is once a relationship of a certain type from a certain class has been created to a specific instance, not more can be added to that instance.

Symmetrically, in the many-to-one relationship, the outgoing relationships are to be restricted such that once the relationship has been created from the specific instance to the class, no more can be created from that instance. A tabular form of the above is provided in table. 4.

TABLE 4

| Constraint type | Out | In |
|---|---|---|
| one-to-one | unique | unique |
| one-to-many | don't care | unique |
| many-to-one | unique | don't care |
| many-to-many | don't care | don't care |

The meaning of uniqueness can be translated to a graph wide property uniqueness constraint by expressing as: for a relationship defined by a source class, a destination class, and the relationship type, there must be a unique instance assigned to each controlled endpoint i.e., the tuple (relationshipType, sourceClass, destinationClass, end, instance) must be unique.

The first three elements can be represented by the constraintSpecification ID, so this can be reduced to: (constraintSpecId, end, instance). This means, for example that the following three constraints can be supported at the same time in the FIG. 5A as described in table. 5:

TABLE 5

| Constraint | Type | Unique value |
|---|---|---|
| cons1 | Class A has many-to-one "contains" relationship to Class B | (cons1Id, out, instanceId) |
| cons2 | Class A has many-to-one "contains" relationship to Class C | (cons2Id, out, instanceId) |
| cons3 | Class A has many-to-one "uses" relationship to Class B | (cons3Id, out, instanceId) |

To enable recording of each relationship constraint on a constraint vertex, a key is built for each relationship constraint. The relationship constraint key can be added either to the constraint vertex of the relevant endpoint vertex, or it can be added to the edge itself. Further, the existing relationship constraint key can be reused for better convenience. The name of the relationship constraint key is required to capture the end classes, the relationship name, and whether this is the in-end of the constraint, or out-end of the constraint (i.e., to disambiguate the ends of a 1-to-1 constraint). Therefore, the constraint specification ID is used to capture the requirement of the relationship constraint key naming criteria automatically. However, this makes for potentially invalid relationship constraint key names, and also invalidates the constraints if the relationship constraint specification is re-created. A more maintainable and robust approach is to encode the parameters. For example: class A contains class B: 1-to-many becomes: cons_A_1_B_M_in. The value of the relationship constraint key is the instance ID of the end that represents the "many" end of the relationship.

The uniqueness of the relationship constraint in the constraint vertex is determined by defining a property within the constraint vertex using a combination of a source node, a destination node, a source type, a destination type, etc. Referring to the FIG. 5A, consider the relationship constraint specification with the one-to-many relationship as follows: ConstraintDefId: 1234; Field: containsC2Base; multSource: 1; multDest: 1 . . . *.

At step 1, C1 contains C2 which is represented with instance IDs as C1: Inst1 contains C2: Inst2. At step 2, the constraint 2 associated with the C2: Inst2 has the property defined as contains_1234_in:_inst2.

At step 3, the C1: Inst1 contains C2: Inst3 and at step 4, the constraint 3 associated with the C2: Inst3 has the property defined as contains_1234_in: inst3. Further, at step 5, when the user tries to add the C1: Inst4 contains C2: Inst3, then the relationship constraint management server (100) provides the error message to the user as the creation of the C1: Inst4 will create a uniqueness violation for the value "inst3".

Similarly, referring to the FIG. 5B, consider the relationship constraint specification with many-to-one relationship as follows: ConstraintDef Id: 1234; Field: containsC2Base; multSource: 1 . . . * and multDest: 1.

At step 1, C1: Inst1 contains C2: Inst3 and at step 2, the property defined as contains_1234_out:_inst1. Similarly, at step 3, C1: Inst2 contains C2: Inst3 with contains_1234_out: _inst2 property defined (step 4). However, at step 5 when the user tries to add C1: Inst1 contains C2: Inst4, then the relationship constraint management server (100) provides the error message to the user as the creation of the C1: Inst1 contains C2: Inst4 will create a uniqueness violation for the value "inst1". Therefore, the proposed method avoids the creation of the constraint vertex based on the uniqueness criteria violation with the relationship constraint.

In an example, consider that the entities include a first college vertex and multiple student vertices. Here, in the perspective of the first college vertex the relationship is many-to-one whereas in the perspective of each student vertex the relationship is one-to-one i.e., many students can be associated with a single college whereas a single student is associated with a single college only at any given point in time. Therefore, in the proposed method the relationship constraint is created by adding a constraint vertex for the student label where a property (with the relationship constraint key) is defined such that each student vertex is related to the first college vertex only. Further, if the user tries to relate any of the student vertex to a second college vertex then the relationship constraint management server (100) will provide an error message to the user and hence the relationship between the student vertex and the second college vertex will be invalid.

Furthermore, consider a scenario where the student is no longer related to the first college vertex and is currently related to the second college vertex. Then, the relationship constraint management server (100) deletes the property (with the relationship constraint key) which defines that each student vertex is related to the first college vertex only from the constraint vertex and adds a new property to the constraint vertex. The new property (with a new relationship constraint key) will define that each student vertex is related to the second college vertex only. Therefore, even when there is an update in the relationship of the entities the relationship constraint management server (100) ensures that there is no overlapping of the relationships.

In an embodiment, an optional relationship is the "zero or more" type of multiplicity as opposed to the "one or more" type. On determining by the relationship constraint management server (100) that one side of the relationship is not optional an additional check is made to confirm that for all mandatory relationship constraints in the relationship exists. The relationship constraint management server (100) manages the below mentioned two situations with respect to the optional relationship between the entities:

1. where the "1" case where a unique relationship constraint key has been defined
2. where the "1 or more" case, where a unique relationship constraint key has not been defined, since there is no uniqueness requirement.

The relationship constraint management server (100) manages the one-to-one mandatory relationship by carrying out a relationship validation within the scope of a single API call. The validation of the mandatory one-to-one relationship is creation of both related objects together as a composite, since independently creating either object would result in a validation error. Further, the relationship constraint validation can leave the data in an inconsistent state, with an indicator of validity, and a method is available to re-validate. The relationship constraint management server (100) provides a warning return for the operation that created the validation error and assumes that the caller will make additional calls to correct the situation that the object is to be fully re-validated on each API request.

To process the above-mentioned relationship management, the relationship constraint management server (100) creates the unique relationship constraint keys on the constraint vertex where a uniqueness guarantee is required either at the local end or the adjacent end, or both. Further, the relationship constraint management server (100) on determining that there is the mandatory relationship check is made that the relationship has been added.

Figure 6A:
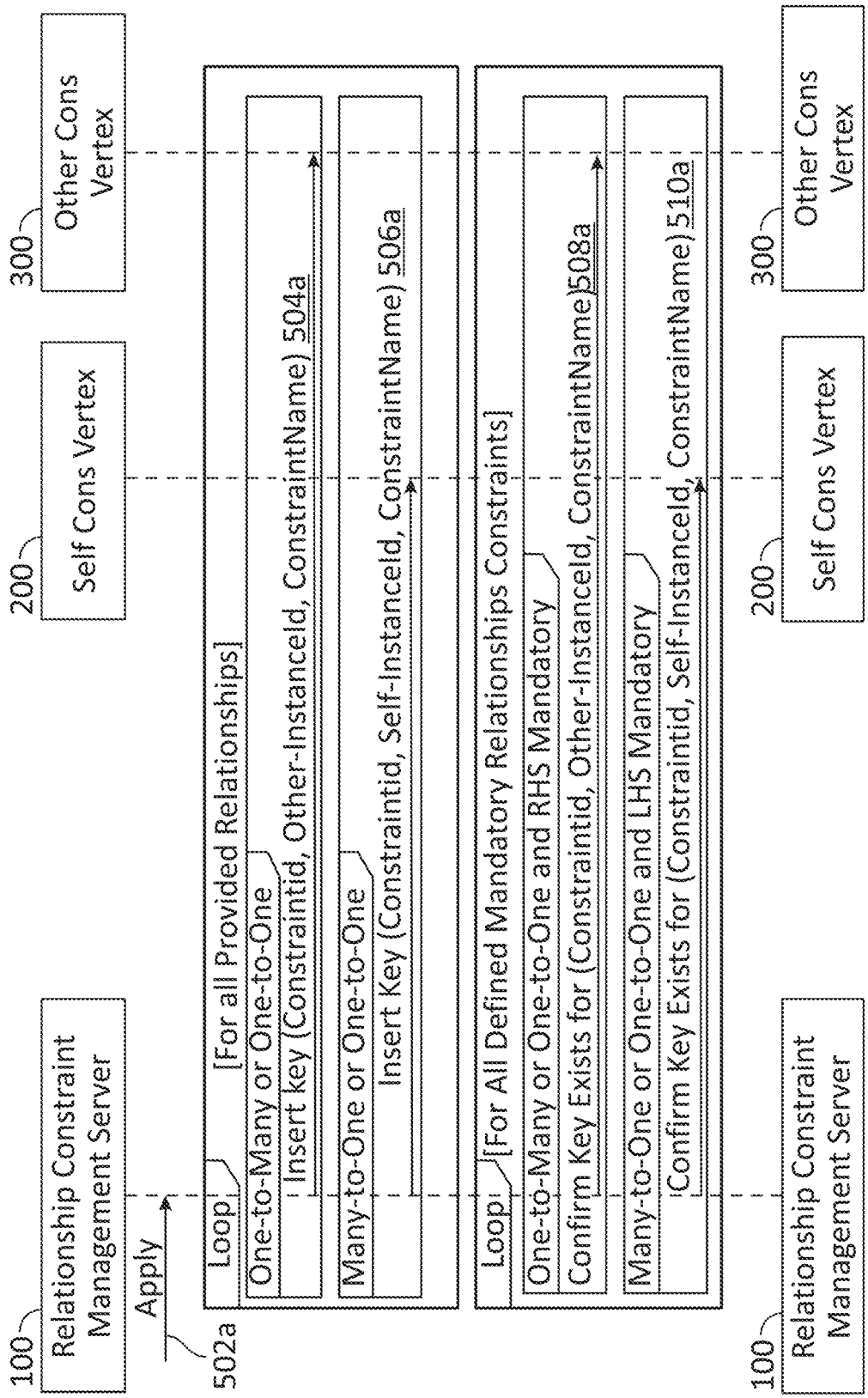
FIG. 6A illustrates step-by-step process for application of the relationship constraint at constraint vertex, according to an embodiment as disclosed herein.

FIG. 6A illustrates step-by-step process for application of the relationship constraint at the constraint vertex, according to an embodiment as disclosed herein.

Figure 6B:
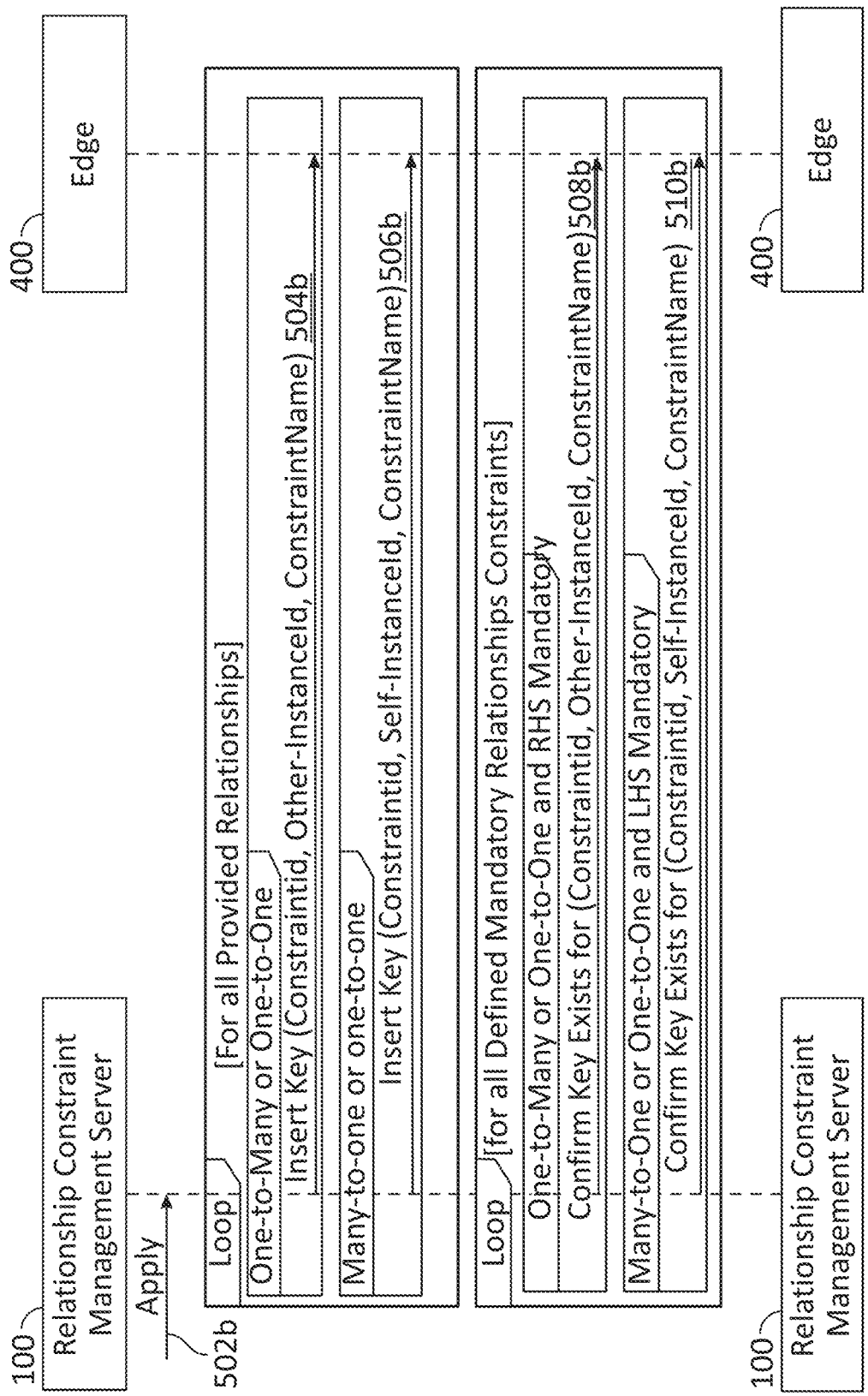
FIG. 6B illustrates step-by-step process for application of the relationship constraints at edge, according to an embodiment as disclosed herein.

FIG. 6B illustrates step-by-step process for application of the relationship constraint at the edge, according to an embodiment as disclosed herein.

Referring to the FIG. 6A, at step 502a, the relationship constraint management server (100) receives a request to apply the YANG file. This includes loading the constraint specification from the YANG file and creating the schema inside the graph database (185). On execution of the apply option, the user is able to create the instances of the particular type from the YANG file. Further, the relationship constraint management server (100) allows for all provided relationships to inset the relationship constraint keys i.e., at step 504a the one-to-many or one-to-one relationships at other constraint vertex (300). The insert key option is executed as Insert key (constraintid, other-instanceId, constraintName). At step 506a, the many-to-one or one-to-one relationships at self-constraint vertex (200). The insert key option is executed as Insert key (constraintid, self-instanceId, constraintName).

The relationship constraint management server (100) for all defined mandatory relationships constraints confirms if the relationship constraint key which is inserted exists. At step 508a, the relationship constraint management server (100) for the one-to-many or one-to-one and RHS mandatory relationships confirms that the relationship constraint key exists for (constraintid, other-instanceId, constraintName) and at step 510a, for the many-to-one or one-to-one and LHS mandatory relationships confirms the relationship constraint key exists for (constraintid, self-instanceId, constraintName).

Therefore, in the proposed method the relationship constraint management server (100) checks for the relationship constraint key creation and thereafter, if on a second request, the same relationship constraint key data comes then the relationship constraint management server (100) rejects it because of the relationship constraints, and loop goes on.

Referring to the FIG. 6B, in conjunction with the FIG. 6A, in another embodiment, the constraint properties can be added to the edges directly instead of the other constraint vertex (300) or the self-constraint vertex (200). Though the addition of the constraint properties is addition of a new method on top of the existing vertex based approach, but the advantage of adding the constraint properties to the edges directly is that the method includes dealing with fewer objects for relationship constraints, especially when the property constraint vertices would otherwise not be required.

Figure 7:
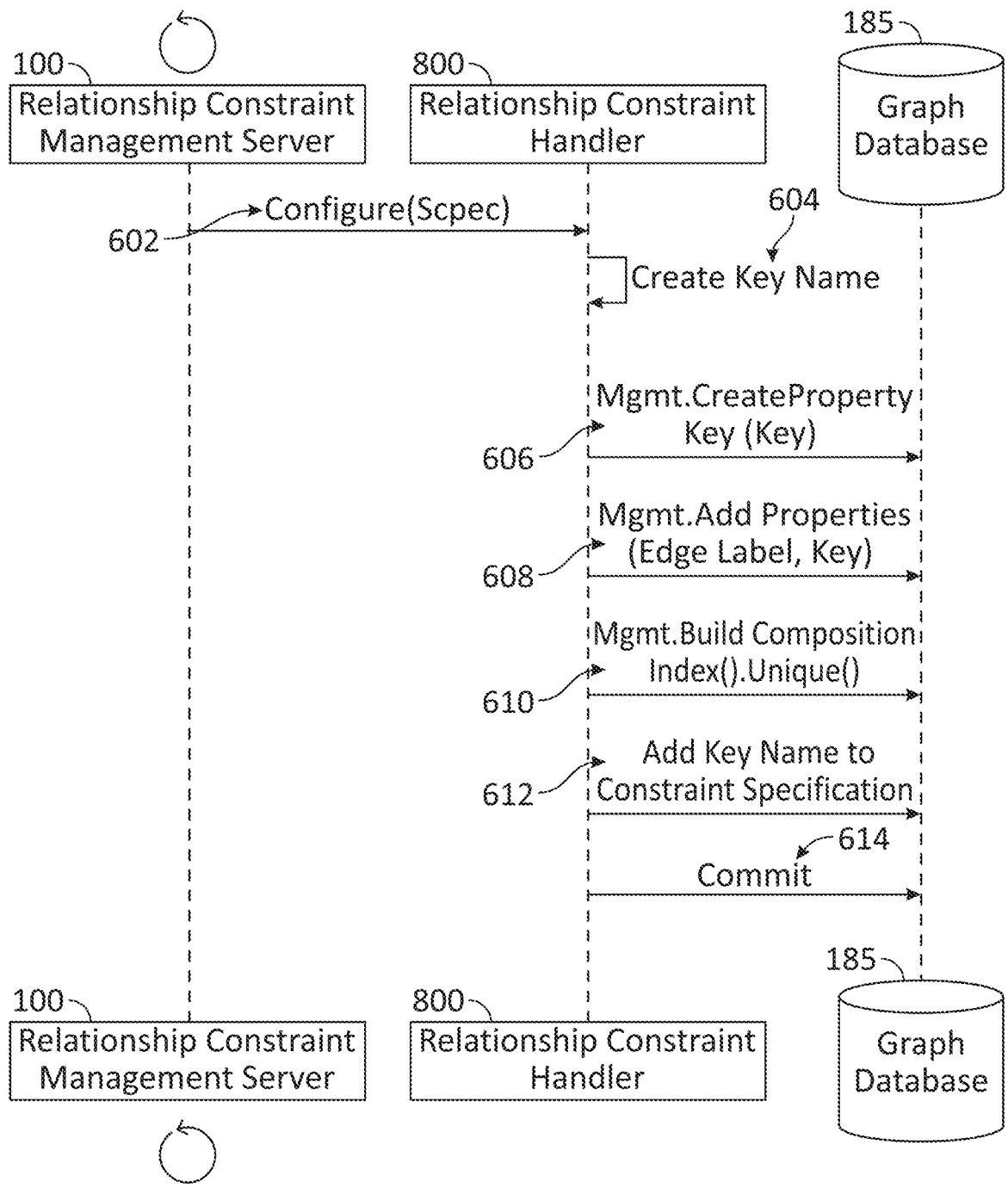
FIG. 7 illustrates step-by-step process for creation of a relationship constraint key during a schema, according to an embodiment as disclosed herein.

FIG. 7 illustrates step-by-step process for the creation of the relationship constraint key during the schema in the graph database (185), according to an embodiment as disclosed herein.

The relationship constraint management server (100) implements a standard interface which is invoked by the constraint framework. At step 602, the relationship constraint management server (100) sends a configure (scpec) command to a relationship constraint handler (800) to load the specification and apply the specification based on the metadata from the graph database (185). At step 604, the relationship constraint handler (800) creates relationship constraint key name. The creation of the constraint properties is performed at the same time as the uniqueness constraints. The property names are generated as:

relc_<RELType>_<LHSClass>_<RHSClass>_<LHSMult>_<RHSMult><IN_or_OUT> where:
- relc is a prefix to indicate relationship constraint,
- RELType is the name of the relationship, e.g. contains,
- LHSClass is the owner (relationship originating) class, with source, i.e. CNF_RCPBase,
- RHSClass is the destination class, with source, i.e. NS_RCPBase,
- LHSMult is left hand side multiplicity, from table above (1, +, *, ?),
- RHSMult is right hand side multiplicity, from table above (1, +, *, ?), and
- IN_or_OUT indicates the direction of the constraint: 1-to-many set to_in, many-to-1 set to_out.

Further, at step 606, the relationship constraint handler (800) sends mgmt.createPropertyKey(key) command to the graph database (185) to create the relationship constraint key and at step 608 the relationship constraint handler (800) sends mgmt.addProperties(edgeLabel, key) command to the graph database (185) to bind the created property to the edge that is being controlled along with the relationship constraint key. Similarly, at step 610 the relationship constraint handler (800) sends mgmt.buildCompositionIndex( ).unique( ), at step 612 the relationship constraint handler (800) adds a relationship constraint key name to constraintSpecification to the graph database (185). At step 614, the relationship constraint handler (800) sends a commit command to end the flow which creates the relationship constraint key during the schema in the graph database (185).

Figure 8:
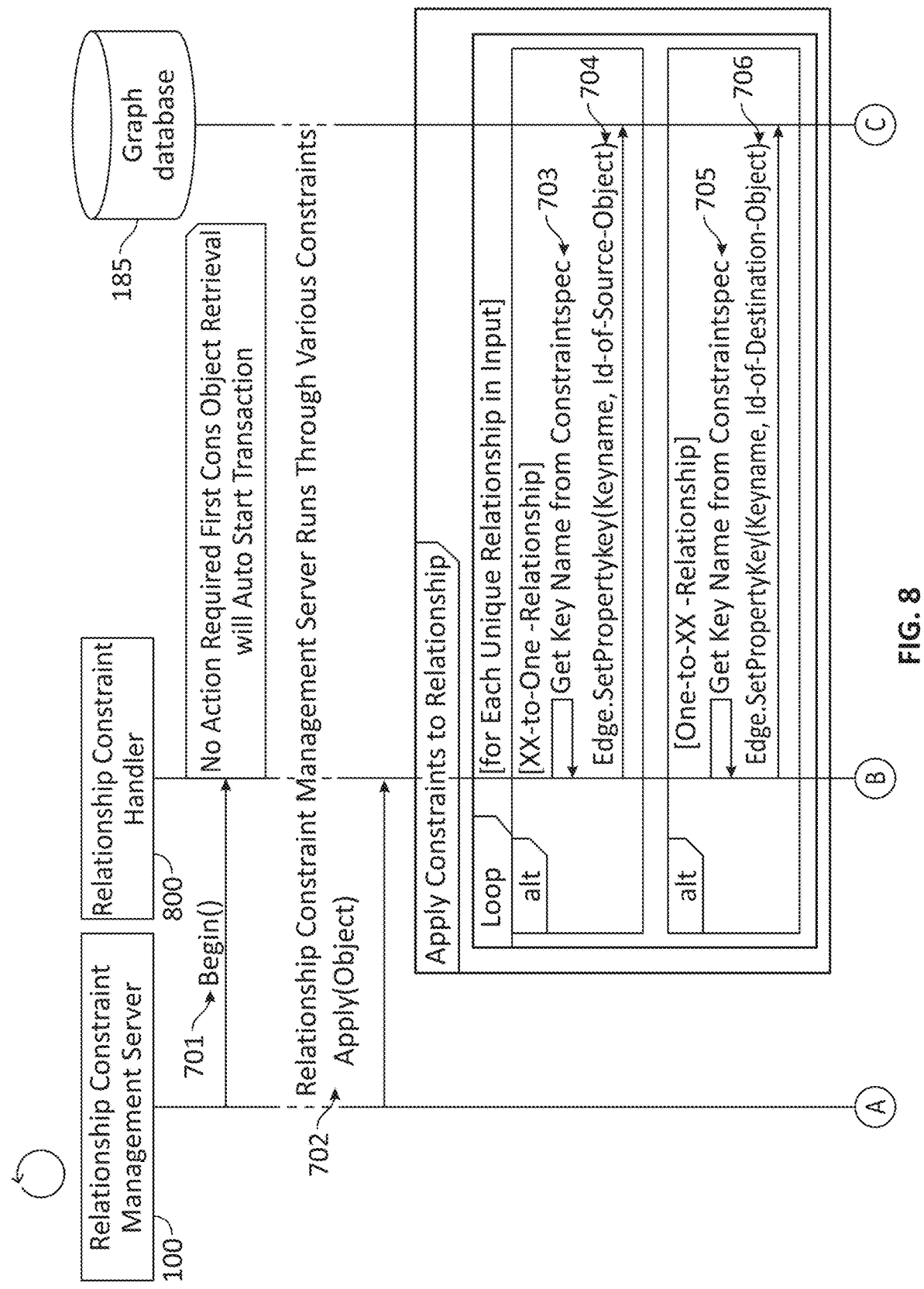
FIG. 8 illustrates step-by-step process for application of the relationship constraints in the graph database, according to an embodiment as disclosed herein.
Figure 8:
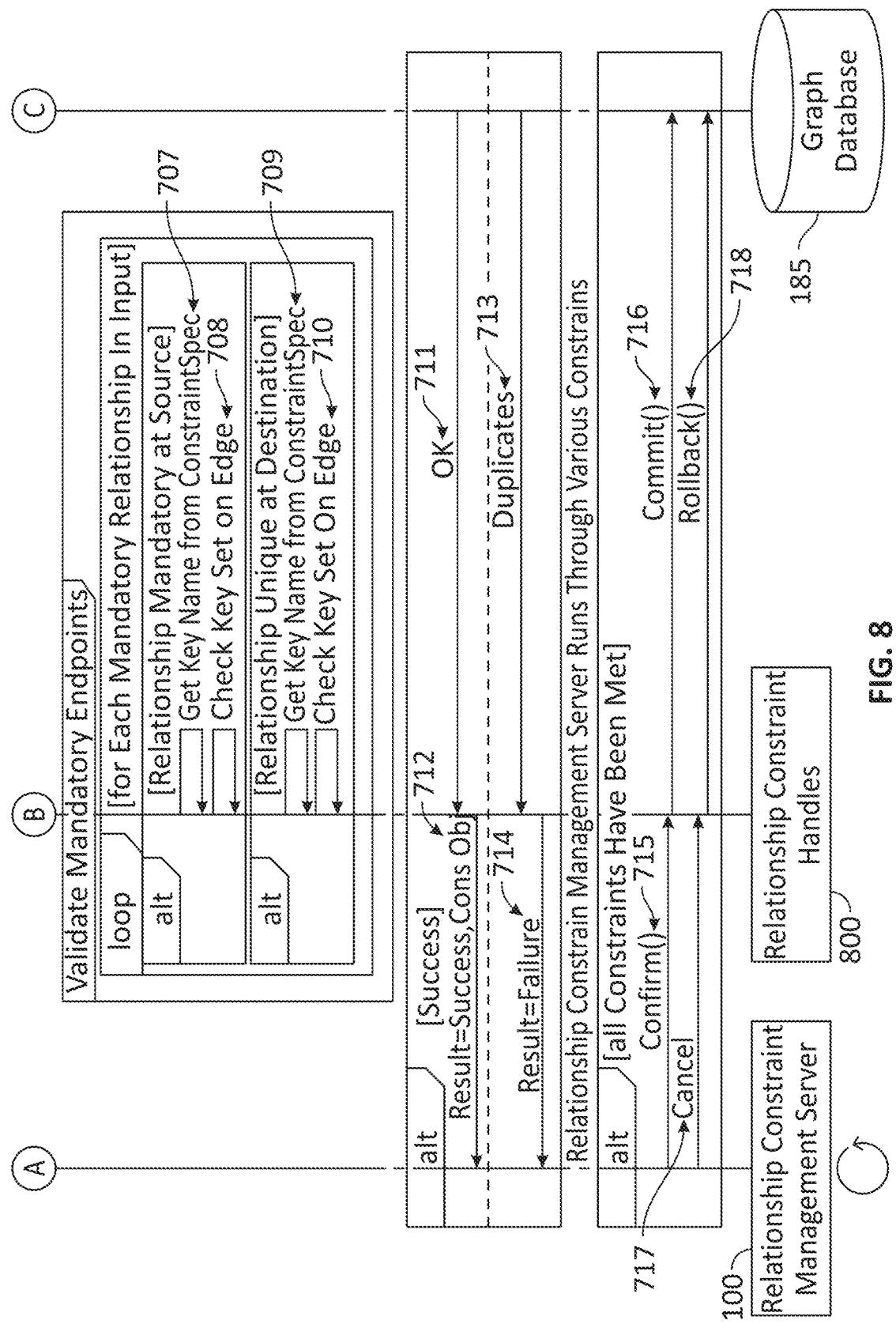

FIG. 8 illustrates step-by-step process for application of the relationship constraint in the graph database (185), according to an embodiment as disclosed herein. Referring to the FIG. 8, at step 702, the operation apply( ) is called in response to either object creation or update (full (PUT), or partial (PATCH)) by the relationship constraint management server (100). The names of the relationship constraint key are pre-calculated and saved during the configure process. The operation apply( )etrieves the relationship constraint key name for the required situation and stores the instance ID of either the source, or destination object as the relationship constraint key value, on the edge for the relationship. Unlike property uniqueness constraints, a separate constraint vertex is not created. By keeping the constraints properties on the edge, these are automatically cleared when the edge is removed from the graph database (185).

Further, the relationship constraint management server (100) is configured to apply constraints to the relationship for each unique relationship in input. For all the XX-to-one-relationships are considered where at step 703, the relationship constraint management server (100) gets the relationship constraint key name from the constraintSpec, and at step 704 the relationship constraint key is set at the edge using (keyname, id-of-source-object). Similarly, for all the one-to-XX-relationship relationships are considered where at step 705, the relationship constraint management server (100) gets the relationship constraint key name from the constraintSpec, and at step 706 the relationship constraint key is set at the edge using (keyname, id-of-destination-object).

The relationship constraint management server (100) validates the mandatory endpoints for each mandatory relationship in input which includes relationship mandatory at source and the relationship unique at destination. The relationship constraint management server (100) then determines the success or failure of the validation.

Figure 9:
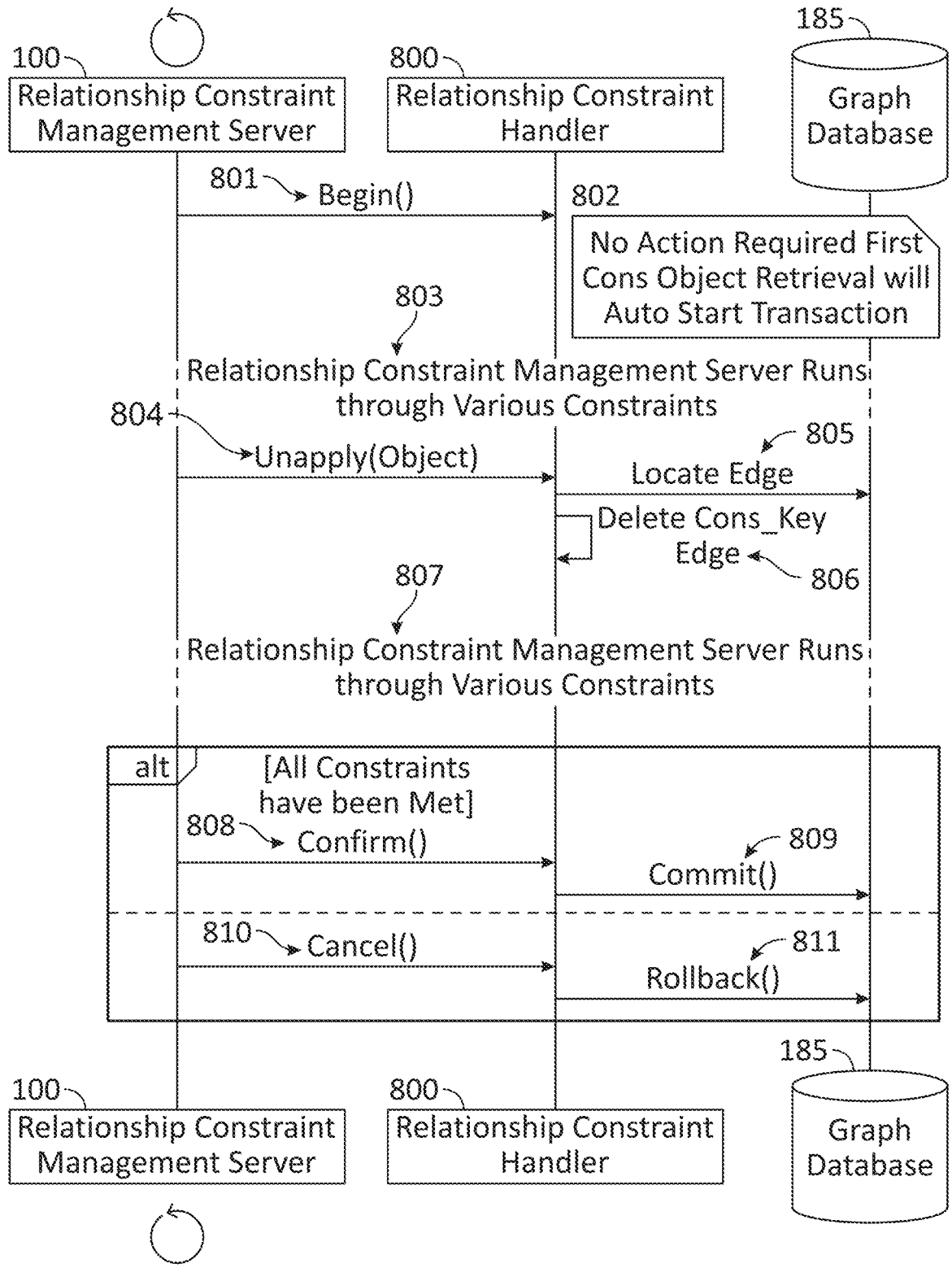
FIG. 9 illustrates step-by-step process for deleting the relationship constraints and the generated relationship constraint key associated with the relationship constraints, according to an embodiment as disclosed herein.

FIG. 9 illustrates step-by-step process for deleting the relationship constraints and the generated relationship constraint keys associated with the relationship constraints, according to an embodiment as disclosed herein. Referring to the FIG. 9, the process of the deletion of the relationship constraint and henceforth the removal of the generated relationship constraint key is provided. The process is executed based on a user requirement i.e., in case the user wants to delete the relationship constraint then the proposed process is executed.

At step 801, the relationship constraint management server (100) sends a begin ( ) command to the relationship constraint handler (800). On receiving the begin ( ) command, at step 802, no action is required and first cons object retrieval will auto start transaction at the graph database (185). At step 803, the relationship constraint management server (100) runs through various relationship constraints and at step 804, the relationship constraint management server (100) sends an unapply (object) command to the relationship constraint handler (800). At step 805, the relationship constraint handler (800) sends a command to the graph database (185) to locate the edge where the generated relationship constraint key needs to be deleted.

At step 806, the relationship constraint handler (800) sends delete cons_key edge command to itself to delete the relationship constraint key at the edge. In response, at step 807, the relationship constraint management server (100) runs through various relationship constraints in the graph database (185). Further, the relationship constraint management server (100) ensures that all constraints have been met by sending various commands between step 808 and step 811.

Therefore, the operation unapply( ) is used to clean up the relationship constraint keys from the relationship constraint management server (100). The relationship constraint keys are stored on the edge and hence the use of the operation unapply( ) is redundant if invoked before deleting the relationship.

Figure 10:
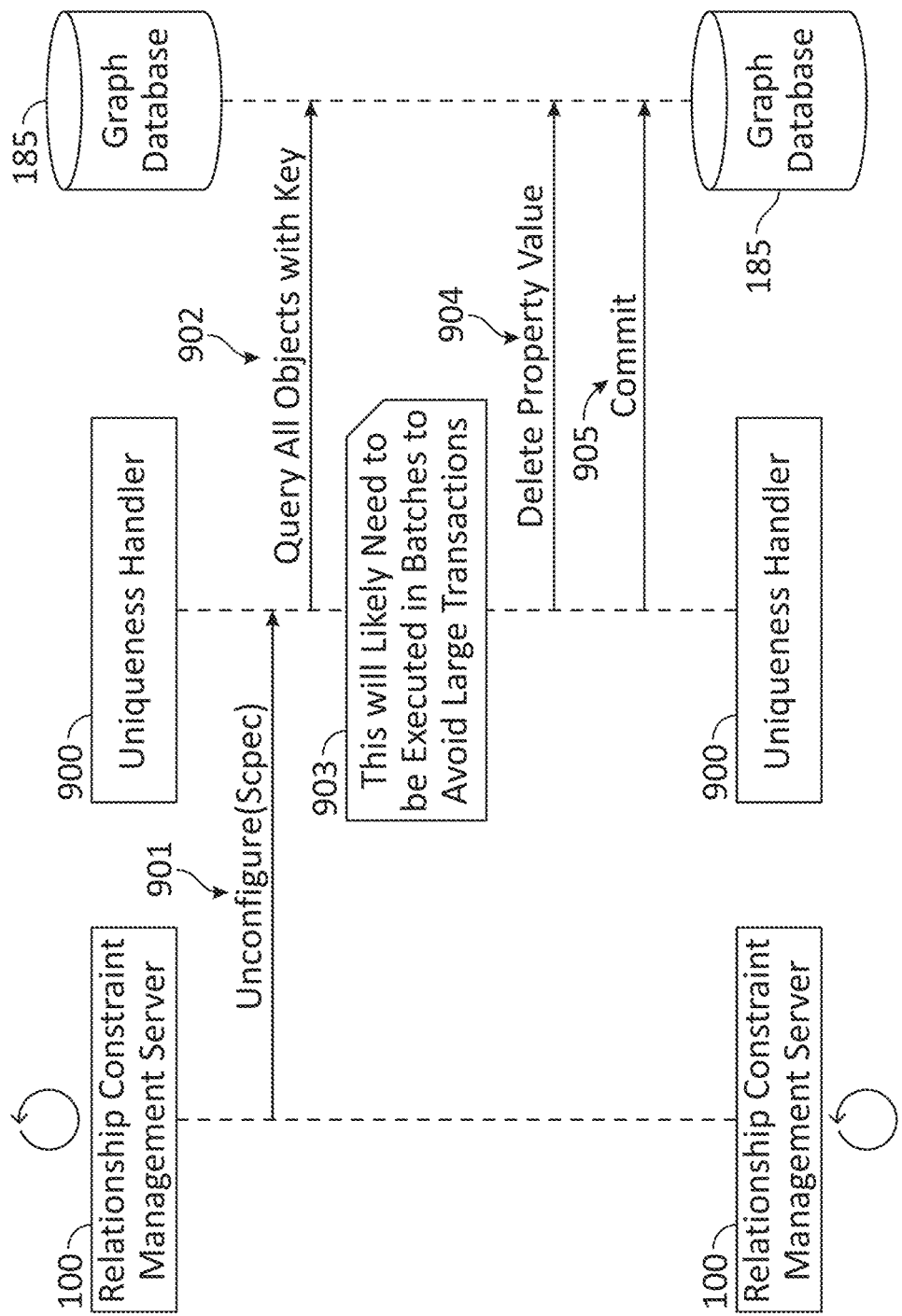
FIG. 10 illustrates step-by-step process for deleting the relationship constraints from all objects, according to an embodiment as disclosed herein.

FIG. 10 illustrates step-by-step process for deleting the relationship constraints from all objects, according to an embodiment as disclosed herein.

The graph database (185) generally does not allow a property key to be deleted. Hence, an unconfigure( ) operation is used to delete all existing relationship constraint key values that the graph database (185) owns. Therefore, the entire relationship constraints are deleted. The entities or the objects, on which the relationship constraint keys are applied, are selected and the relationship constraint is deleted from all the entities or the objects.

Referring to the FIG. 10, at step 901, the relationship constraint management server (100) sends the unconfigure (scpec) to a uniqueness handler (900) to delete the specification related to the relationship constraints from all the objects. At step 902, the uniqueness handler (900) queries all the objects in the graph database (185) with the relationship constraint key. At step 903, the uniqueness handler (900) executes the unconfigure (scpec) operation based on all the specifications of the relationship constraint stored in the graph database (185) by the query in batches to avoid large transactions simultaneously. Further, at step 904, the uniqueness handler (900) sends a delete property value to the graph database (185) and at step 905, the uniqueness handler (900) sends a commit command to the graph database (185) which deletes all the existing properties key values that the graph database (185) owns.

Another operation which can be used by the relationship constraint management server (100) is reapply ( ) operation.

The reapply operation clears the existing relationship constraint key and invokes apply operation to create a new relationship constraint key.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method for managing relationship constraints associated with entities in a graph database, wherein the method comprises:
    receiving, by a relationship constraint management server, a request to perform at least one operation associated with at least one entity, wherein the request comprises information of at least one entity;
    generating, by the relationship constraint management server, an entity configuration file based on the received information of the at least one entity, wherein the entity configuration file comprises at least one relationship constraint from a plurality of relationship constraints to be applied while performing the at least one operation, wherein the at least one relationship constraint includes a restriction on multiplicity of relationships, wherein the restriction on multiplicity of relationships defines a source multiplicity and a destination multiplicity;
    retrieving, by the relationship constraint management server, metadata corresponding to relationship constraints from a constraint database based on the entity configuration file; and
    performing, by the relationship constraint management server, the at least one operation associated with the at least one entity based on the metadata corresponding to the relationship constraints and the information of the at least one entity.

2. The method as claimed in claim 1, wherein the at least one operation associated with the at least one entity is a create operation, an update operation and a delete operation.

3. The method as claimed in claim 1, further comprises:
    determining, by the relationship constraint management server, the at least one determined operation is the create operation and the update operation; and
    storing, by the relationship constraint management server, the at least one created entity and the updated entity in the graph database.

4. The method as claimed in claim 1, wherein performing, by the relationship constraint management server, the at least one operation associated with the at least one entity based on the metadata corresponding to the relationship constraints and the information of the at least one entity comprises:
    determining, by the relationship constraint management server, the at least one operation associated with the at least one entity is one of the create operation, the update operation and the delete operation;
    validating, by the relationship constraint management server, the information received for performing the at least one determined operation associated with the at least one entity by using a relationship constraint key for each of the relationship constraints on the information received for the at least one entity; and
    performing, by the relationship constraint management server, the at least one determined operation associated with the at least one entity based on the metadata corresponding to the relationship constraints and the information of the at least one entity.

5. The method as claimed in claim 4, wherein performing, by the relationship constraint management server, the create operation associated with the at least one entity based on the metadata corresponding to the relationship constraints and the information of the at least one entity comprising:
    generating, by the relationship constraint management server, the relationship constraint key for each of the relationship constraints based on the information of the at least one entity, wherein the at least one determined operation is the creation operation;
    adding, by the relationship constraint management server, the relationship constraint key for each of the relationship constraints in a constraint data field of the entity configuration file;
    validating, by the relationship constraint management server, the information received for creating the at least one entity by using the relationship constraint key for each of the relationship constraints on the information received for creating the at least one entity; and
    creating, by the relationship constraint management server, the at least one entity based on the metadata corresponding to the relationship constraints and the information of the at least one entity in response to successful validation of the information received.

6. The method as claimed in claim 4, wherein performing, by the relationship constraint management server, the update operation associated with the at least one entity based on the metadata corresponding to the relationship constraints and the information of the at least one entity comprising:
    retrieving, by the relationship constraint management server, the relationship constraint key for each of the relationship constraints in the constraint data field of the entity configuration file of the at least one entity to be updated, wherein the at least one determined operation is the creation operation;
    validating, by the relationship constraint management server, the information received for updating the at least one entity by using the relationship constraint key for each of the relationship constraints on the information received for updating the at least one entity; and
    updating, by the relationship constraint management server, the at least one entity based on the metadata corresponding to the relationship constraints and the information of the at least one entity in response to successful validation of the information received.

7. The method as claimed in claim 1, wherein each relationship constraint of the plurality of constrain comprises a relationship constraint type, a relationship constraint scope, a relationship constraint scope field, and a relationship constraint field.

8. The method as claimed in claim 4, wherein performing, by the relationship constraint management server, the delete operation associated with the at least one entity based on the metadata corresponding to the relationship constraints and the information of the at least one entity comprising:
    retrieving, by the relationship constraint management server, the relationship constraint key for each of the relationship constraints in the constraint data field of the entity configuration file of the at least one entity to be deleted, wherein the at least one determined operation is the creation operation;

validating, by the relationship constraint management server, the information received for deleting the at least one entity by using the relationship constraint key for each of the relationship constraints on the information received for deleting the at least one entity;

deleting, by the relationship constraint management server, the relationship constraint key for each of the relationship constraints in the constraint data field of the entity configuration file of the at least one entity to be deleted; and deleting, by the relationship constraint management server, the at least one relationship associated with the at least one entity to be deleted.

9. A relationship constraint management server for managing relationship constraints associated with entities in a graph database, wherein the relationship constraint management server comprises:
  a memory;
  a processor coupled to the memory;
  a communicator coupled to the memory and the processor;
  a relationship management controller coupled to the memory and the processor, is configured to:
  receive a request to perform at least one operation associated with at least one entity, wherein the request comprises information of at least one entity;
  generate an entity configuration file based on the received information of the at least one entity, wherein the entity configuration file comprises at least one relationship constraint from a plurality of relationship constraints to be applied while performing the at least one operation, wherein the at least one relationship constraint includes a restriction on multiplicity of relationships, wherein the restriction on multiplicity of relationships defines a source multiplicity and a destination multiplicity;
  retrieve metadata corresponding to relationship constraints from a constraint database based on the entity configuration file; and
  perform the at least one operation associated with the at least one entity based on the metadata corresponding to the relationship constraints and the information of the at least one entity.

10. The relationship constraint management server as claimed in claim 9, wherein the at least one operation associated with the at least one entity is create operation, update operation and delete operation.

11. The relationship constraint management server as claimed in claim 9, wherein the relationship management controller is further configured to:
  determine the at least one determined operation is the create operation and the update operation; and
  store the at least one created entity and the updated entity in the graph database.

12. The relationship constraint management server as claimed in claim 9, wherein the relationship management controller is configured to perform the at least one operation associated with the at least one entity based on the metadata corresponding to the relationship constraints and the information of the at least one entity comprises:
  determine the at least one operation associated with the at least one entity is one of the create operation, the update operation and the delete operation;
  validate the information received for performing the at least one determined operation associated with the at least one entity by using a relationship constraint key for each of the relationship constraints on the information received for the at least one entity; and
  perform the at least one determined operation associated with the at least one entity based on the metadata corresponding to the relationship constraints and the information of the at least one entity.

13. The relationship constraint management server as claimed in claim 12, wherein the relationship management controller is configured to perform the create operation associated with the at least one entity based on the metadata corresponding to the relationship constraints and the information of the at least one entity comprising:
  generate the relationship constraint key for each of the relationship constraints based on the information of the at least one entity, wherein the at least one determined operation is the creation operation;
  add the relationship constraint key for each of the relationship constraints in a constraint data field of the entity configuration file;
  validate the information received for creating the at least one entity by using the relationship constraint key for each of the relationship constraints on the information received for creating the at least one entity; and
  create the at least one entity based on the metadata corresponding to the relationship constraints and the information of the at least one entity in response to successful validation of the information received for creating the at least one entity.

14. The relationship constraint management server as claimed in claim 12, wherein the relationship management controller is configured to perform the update operation associated with the at least one entity based on the metadata corresponding to the relationship constraints and the information of the at least one entity comprising:
  retrieve the relationship constraint key for each of the relationship constraints in the constraint data field of the entity configuration file of the at least one entity to be updated, wherein the at least one determined operation is the creation operation;
  validate the information received for updating the at least one entity by using the relationship constraint key for each of the relationship constraints on the information received for updating the at least one entity; and
  update the at least one entity based on the metadata corresponding to the relationship constraints and the information of the at least one entity in response to successful validation of the information received for updating the at least one entity.

15. The relationship constraint management server as claimed in claim 9, wherein each relationship constraint of the plurality of constrain comprises a relationship constraint type, a relationship constraint scope, a relationship constraint scope field, and a relationship constraint field.

16. A Computer Program Product (CPP) for managing relationship constraints associated with entities in a graph database, wherein the CPP comprises:
  a computer executable program code recorded on a computer readable non-transitory storage medium, wherein said computer executable program code when executed causing the actions including:
  receiving a request to perform at least one operation associated with at least one entity, wherein the request comprises information of at least one entity;
  generating an entity configuration file based on the received information of the at least one entity, wherein the entity configuration file comprises at least one relationship constraint from a plurality of relationship constraints to be applied while performing the at least one operation, wherein the at least one relationship constraint includes a restriction on multiplicity of relationships, wherein the restriction on multiplicity of relationships defines a source multiplicity and a destination multiplicity;

retrieving metadata corresponding to relationship constraints from a constraint database based on the entity configuration file; and performing the at least one operation associated with the at least one entity based on the metadata corresponding to the relationship constraints and the information of the at least one entity.

17. The CPP as claimed in claim 16, wherein the at least one operation associated with the at least one entity is create operation, update operation and delete operation.

18. The CPP as claimed in claim 16, further comprises:
determining the at least one determined operation is the create operation and the update operation; and
storing the at least one created entity and the updated entity in the graph database.

19. The CPP as claimed in claim 16, wherein performing the at least one operation associated with the at least one entity based on the metadata corresponding to the relationship constraints and the information of the at least one entity comprises:
determining the at least one operation associated with the at least one entity is one of the create operation, the update operation and the delete operation;
validating the information received for performing the at least one determined operation associated with the at least one entity by using a relationship constraint key for each of the relationship constraints on the information received for the at least one entity; and
performing the at least one determined operation associated with the at least one entity based on the metadata corresponding to the relationship constraints and the information of the at least one entity.

20. The CPP as claimed in claim 19, wherein performing the create operation associated with the at least one entity based on the metadata corresponding to the relationship constraints and the information of the at least one entity comprising:
generating the relationship constraint key for each of the relationship constraints based on the information of the at least one entity, wherein the at least one determined operation is the creation operation;
adding the relationship constraint key for each of the relationship constraints in a constraint data field of the entity configuration file;
validating the information received for creating the at least one entity by using the relationship constraint key for each of the relationship constraints on the information received for creating the at least one entity; and
creating the at least one entity based on the metadata corresponding to the relationship constraints and the information of the at least one entity in response to successful validation of the information received for creating the at least one entity.

21. The CPP as claimed in claim 19, wherein performing the update associated with the at least one entity based on the metadata corresponding to the relationship constraints and the information of the at least one entity comprising:
retrieving the relationship constraint key for each of the relationship constraints in the constraint data field of the entity configuration file of the at least one entity to be updated, wherein the at least one determined operation is the creation operation;
validating the information received for updating the at least one entity by using the relationship constraint key for each of the relationship constraints on the information received for updating the at least one entity; and
updating the at least one entity based on the metadata corresponding to the relationship constraints and the information of the at least one entity in response to successful validation of the information received for updating the at least one entity.

22. The CPP as claimed in claim 16, wherein each relationship constraint of the plurality of constrain comprises a relationship constraint type, a relationship constraint scope, a relationship constraint scope field, and a relationship constraint field.

23. The CPP as claimed in claim 19, wherein performing the delete operation associated with the at least one entity based on the metadata corresponding to the relationship constraints and the information of the at least one entity comprising:
retrieving the relationship constraint key for each of the relationship constraints in the constraint data field of the entity configuration file of the at least one entity to be deleted, wherein the at least one determined operation is the creation operation;
validating the information received for deleting the at least one entity by using the relationship constraint key for each of the relationship constraints on the information received for deleting the at least one entity;
deleting the relationship constraint key for each of the relationship constraints in the constraint data field of the entity configuration file of the at least one entity to be deleted; and
deleting the at least one relationship associated with the at least one entity to be deleted.

\* \* \* \* \*